United States Patent
Koyanagi et al.

(10) Patent No.: US 9,866,120 B2
(45) Date of Patent: Jan. 9, 2018

(54) POWER CONVERSION DEVICE

(71) Applicants: MITSUBISHI ELECTRIC CORPORATION, Chiyoda-ku (JP); TOSHIBA MITSUBISHI-ELECTRIC INDUSTRIAL SYSTEMS CORPORATION, Chuo-Ku (JP)

(72) Inventors: Kimiyuki Koyanagi, Chiyoda-ku (JP); Takushi Jimichi, Chiyoda-ku (JP); Yasuhiro Shinomiya, Chuo-Ku (JP); Taichiro Tsuchiya, Chuo-Ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/311,953

(22) PCT Filed: Apr. 21, 2015

(86) PCT No.: PCT/JP2015/062065
§ 371 (c)(1),
(2) Date: Nov. 17, 2016

(87) PCT Pub. No.: WO2016/002319
PCT Pub. Date: Jan. 7, 2016

(65) Prior Publication Data
US 2017/0126127 A1    May 4, 2017

(30) Foreign Application Priority Data
Jun. 30, 2014  (JP) .................................. 2014-133972

(51) Int. Cl.
*H02M 3/158*    (2006.01)
*H02M 1/32*    (2007.01)

(52) U.S. Cl.
CPC ............. *H02M 3/158* (2013.01); *H02M 1/32* (2013.01)

(58) Field of Classification Search
CPC ............. H02M 1/32; H02M 2001/325; H02M 2001/0006; H02M 2007/4835
See application file for complete search history.

(56) References Cited

U.S. PATENT DOCUMENTS 8,942,014 B2 *   1/2015  Norrga ..................... H02M 1/32
                                                            363/68
9,735,666 B2 *   8/2017  Shimomugi ............ H02M 1/32
(Continued)

FOREIGN PATENT DOCUMENTS

EP    2 549 634 A1    1/2013
JP    5241820 B2    7/2013
(Continued)

OTHER PUBLICATIONS

International Search Report dated Jul. 14, 2015 in PCT/JP2015/062065 filed Apr. 21, 2015.
(Continued)

*Primary Examiner* — Yusef Ahmed
(74) *Attorney, Agent, or Firm* — Oblon, McClelland, Maier & Neustadt, L.L.P.

(57) ABSTRACT

A power conversion device including: an energy storage unit which receives and stores voltage of a self-power-feeding device; and a bypass unit drive device which, when voltage of the self-power-feeding device becomes smaller than a predetermined lower limit value, causes a bypass unit to perform short-circuiting operation by power stored in the energy storage unit. Thus, by appropriately setting the above voltage lower limit value as a threshold value for the short-circuiting operation, it becomes possible to swiftly and reliably perform short-circuiting protection operation even if (Continued)

a cell converter has failed, thus it is possible to always safely continue the operation of the power conversion device.

9 Claims, 6 Drawing Sheets

(56) References Cited

U.S. PATENT DOCUMENTS

| | | | | |
|---|---|---|---|---|
| 2008/0304298 | A1* | 12/2008 | Toba | H02H 7/122 |
| | | | | 363/56.01 |
| 2010/0013324 | A1* | 1/2010 | Yamashita | H01M 10/44 |
| | | | | 307/125 |
| 2010/0118453 | A1* | 5/2010 | Dorn | H01H 79/00 |
| | | | | 361/54 |
| 2010/0327837 | A1* | 12/2010 | Tsugawa | H02M 1/32 |
| | | | | 323/285 |
| 2011/0235221 | A1* | 9/2011 | Vogeli | H02M 1/32 |
| | | | | 361/18 |
| 2013/0208519 | A1 | 8/2013 | Yamamoto et al. | |
| 2014/0313797 | A1* | 10/2014 | Davidson | H02M 7/49 |
| | | | | 363/50 |
| 2015/0349520 | A1* | 12/2015 | Davidson | H02M 7/483 |
| | | | | 361/57 |
| 2016/0013716 | A1* | 1/2016 | Hur | H02M 1/32 |
| | | | | 363/50 |
| 2016/0036314 | A1* | 2/2016 | Koyanagi | H02M 1/32 |
| | | | | 363/65 |
| 2016/0190924 | A1* | 6/2016 | Koyanagi | H02M 7/483 |
| | | | | 323/271 |
| 2016/0294276 | A1* | 10/2016 | Onishi | H02M 1/36 |
| 2017/0012521 | A1* | 1/2017 | Jimichi | H02M 7/483 |
| 2017/0149352 | A1* | 5/2017 | Arisawa | H02M 7/06 |
| 2017/0163170 | A1* | 6/2017 | Tahata | H02M 7/155 |

FOREIGN PATENT DOCUMENTS

| | | |
|---|---|---|
| JP | 2013-169088 A | 8/2013 |
| JP | 5378274 B2 | 12/2013 |
| JP | 5431398 B2 | 3/2014 |
| WO | WO 2010/145688 A1 | 12/2010 |
| WO | WO 2011/114816 A1 | 9/2011 |

OTHER PUBLICATIONS

Extended European Search Report dated Oct. 11. 2017, in European Patent Application No. 15815326.2.

Office Action dated Nov. 7, 2017 in Japanese Patent Application No. 2016-531161 (with English-language Translation).

* cited by examiner

POWER CONVERSION DEVICE

TECHNICAL FIELD

The present invention relates to a power conversion device having a plurality of cell converters connected in series to each other, and in particular, to technology of bypassing the cell converters when the cell converters have failed.

BACKGROUND ART

A modular multilevel converter (MMC) is a circuit system in which output terminals of cell converters having switching elements such as IGBT for which ON/OFF control can be performed and DC capacitors are connected in series to each other, thereby voltage equal to or greater than the withstand voltage of the switching elements can be output. This circuit system is expected to be applied to a DC power transmission system (HVDC), a static synchronous compensator (STATCOM), and the like.

For example, according to Patent Document 1, an MMC comprises a plurality of cell converters connected in series (cascade). Each cell converter includes a main circuit composed of a switching element and a DC capacitor, external terminals to be connected in cascade to other cell converters, bypass means connected between the respective ends of the external terminals, and a self-power supply which obtains energy from the DC capacitor of the main circuit and drives the bypass means and the like.

Through ON/OFF control of the switching element, the voltage between the external terminals can be controlled to be the voltage of the DC capacitor provided in the corresponding cell converter, or zero. The bypass means is a short-circuit switch of normally-ON type which is capable of short-circuiting output of the cell converter when this cell converter has failed, and by this short-circuit switch, the output of the cell converter that has failed is short-circuited by the short-circuit switch, thus it is possible to continue its operation as the system even if the cell converter has failed.

That is, in each cell converter 105, as the bypass means, a short-circuit switch 209 of normally-ON type is connected in parallel to the output terminals. A self-power supply 208 is connected in parallel to a DC capacitor 203, and drive power for the short-circuit switch 209 is supplied from the self-power supply 208.

When the cell converter 105 is stopped, the drive power is no longer supplied from the self-power supply 208, and thus the short-circuit switch 209 turns on by itself to short-circuit the output of the cell converter 105, thereby it is possible to continue its operation as the power conversion device even if one cell converter 105 has failed.

CITATION LIST

Patent Document

Patent Document 1: Japanese Patent Publication No. 5378274 (see claim 11, paragraphs [0100] to [0102], FIGS. 1 and 2, etc.)

SUMMARY OF THE INVENTION

Problems to be Solved by the Invention

However, in the case of the conventional power conversion device in Patent Document 1, in order for the short-circuit switch 209 of normally-ON type to perform short-circuiting operation by itself, it is necessary to wait until the voltage supplied from the self-power supply 208 to the short-circuit switch 209 naturally reduces to a level that allows the short-circuiting operation, and depending on the type of the failure, it might take a long time from occurrence of the failure to the short-circuiting operation.

Further, if the voltage from the self-power supply 208 fluctuates up and down in the vicinity of the level that allows short-circuiting operation, chattering of the short-circuiting operation of the short-circuit switch 209 might occur, and an unstable state might occur. Due to these, there is a possibility that operation of the power conversion device cannot be continued temporarily.

The present invention has been made to solve the above problem, and an object of the present invention is to provide a power conversion device that enables operation as a power conversion device to be always safely continued even if a cell converter has failed.

Means of Solution to the Problems

A power conversion device according to the present invention is a power conversion device comprising a plurality of cell converters connected in series to each other, each cell converter having a main circuit including switching elements and a capacitor; a pair of external terminals for leading the main circuit to outside; a bypass unit capable of making short circuit between the pair of external terminals; a gate drive device for performing ON/OFF control of the switching elements, thereby for performing power conversion between the pair of external terminals and the capacitor; and a self-power-feeding device for receiving voltage of the capacitor and for feeding power to the gate drive device, the power conversion device comprising an energy storage unit for receiving and storing voltage of the self-power-feeding device; and a bypass unit drive device for causing the bypass unit to perform short-circuiting operation by power stored in the energy storage unit when voltage of the self-power-feeding device becomes smaller than a predetermined lower limit value.

EFFECT OF THE INVENTION

As described above, the power conversion device according to the present invention includes, in particular, an energy storage unit which receives and stores voltage of a self-power-feeding device, and a bypass unit drive device which, when voltage of the self-power-feeding device becomes smaller than a predetermined lower limit value, causes the bypass unit to perform short-circuiting operation by power stored in the energy storage unit. Thus, by appropriately setting the above voltage lower limit value as a threshold value for the short-circuiting operation, it becomes possible to swiftly and reliably perform short-circuiting protection operation even if the cell converter has failed, thus it is possible to always safely continue the operation of the power conversion device

EMBODIMENTS FOR CARRYING OUT THE INVENTION

Embodiment 1

Figure 1:
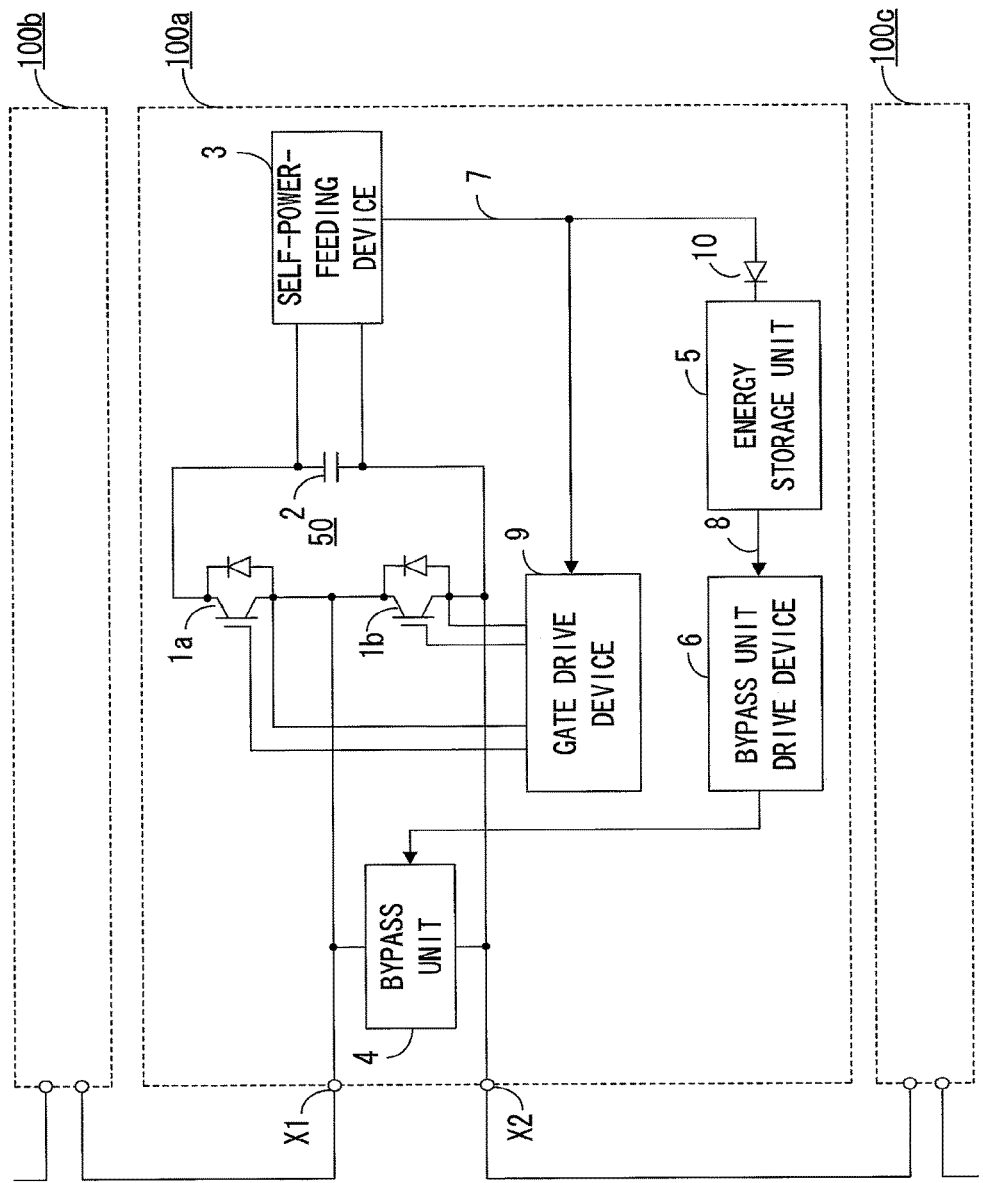
FIG. 1 is a diagram showing the configuration of a power conversion device according to embodiment 1 of the present invention.

FIG. 1 is a diagram showing the configuration of a power conversion device according to embodiment 1 of the present invention. The power conversion device includes cell converters 100a, 100b, 100c, . . . , which are connected in series (cascade) to each other. Hereinafter, as a representative, the cell converter 100a is referred to as a cell converter 100, and the internal configuration thereof will be described.

Switching elements 1a and 1b such as IGBT which can perform ON/OFF control are connected in series to each other, and a capacitor 2 is connected thereto, thereby a main circuit 50 is formed. Diodes are connected in anti-parallel to the respective switching elements 1a and 1b. The main circuit 50 is led to the outside via a pair of external terminals X1 and X2, to be connected to other cell converters 100b and 100c. A bypass unit 4 is connected to the external terminals X1 and X2.

Further, a self-power-feeding device 3 is provided which receives the voltage of the capacitor 2 of the main circuit 50 and feeds power to a gate drive device 9 and an energy storage unit 5 described later.

Normally, the self-power-feeding device 3 is configured from a DC/DC converter which converts high voltage of the capacitor 2 fluctuating due to operation of the main circuit 50, to constant low voltage.

On the basis of power fed from the self-power-feeding device 3 via a first feed line 7, the gate drive device 9 performs ON/OFF control on the switching elements 1a and 1b, thereby performing power conversion between the pair of external terminals X1 and X2 and the capacitor 2. And the voltage of the capacitor 2 or zero voltage is output between the external terminals X1 and X2.

The energy storage unit 5 receives voltage of the self-power-feeding device 3 via the first feed line 7, and stores the power. For the reason described later, it is desirable that a diode 10 for preventing current from flowing in the direction opposite to the power feed direction is interposed at a part, of the first feed line 7, connected to the energy storage unit 5.

As the energy storage unit 5, a capacitor or a storage battery such as an electric double-layer may be employed.

In general, the former capacitor is less expensive than the storage battery, and has a wider variety of capacitances, thus having an advantage that an appropriate capacitance can be easily selected.

In the case of employing the latter storage battery, the amount of natural discharge is small, and thus there is an advantage that power from the self-power-feeding device 3 can be efficiently stored.

Figure 2:
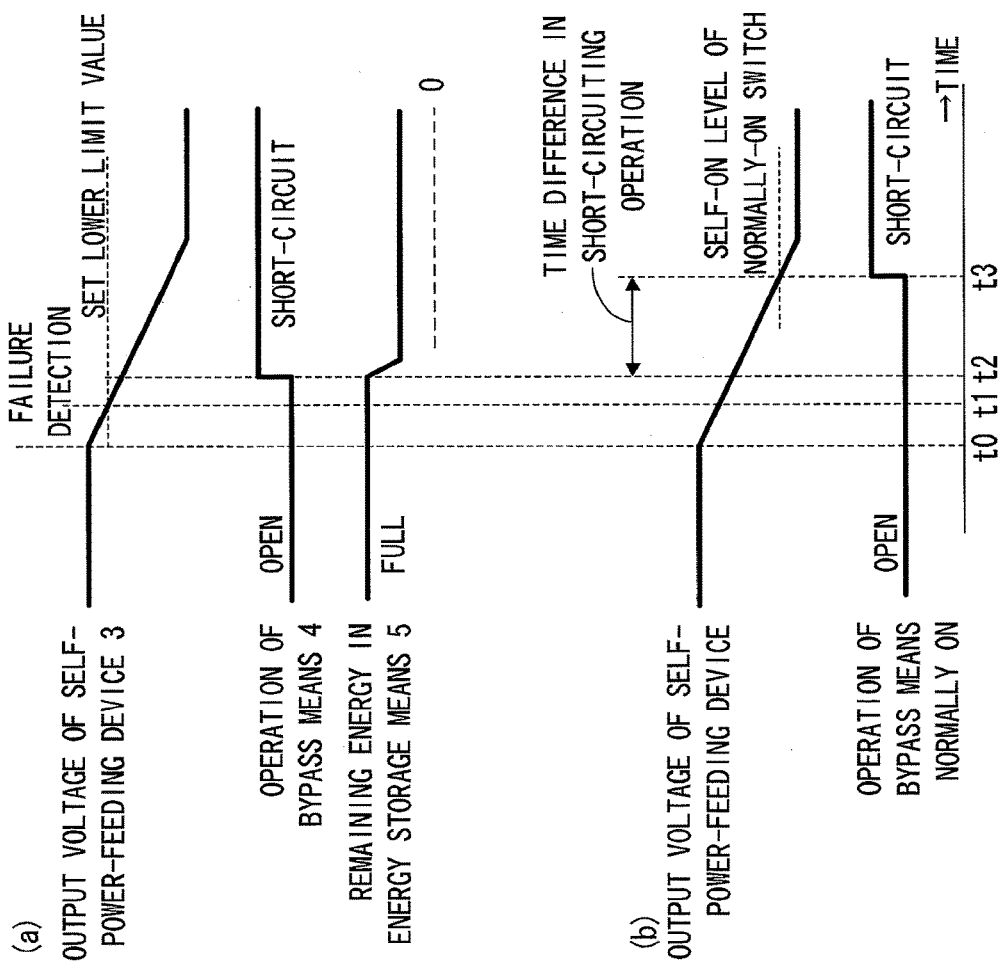
FIG. 2 is a timing chart showing an operation timing of a bypass unit 4 in FIG. 1, compared with the conventional example.

A bypass unit drive device 6 receives the power stored in the energy storage unit 5, via a second feed line 8, and as described later with reference to FIG. 2, when the voltage of the self-power-feeding device 3 becomes smaller than a predetermined lower limit value, the bypass unit drive device 6 causes the bypass unit 4 to perform short-circuiting operation, by the stored power.

Next, protection operation in which, when the cell converter 100 has failed, the bypass unit 4 is performed short-circuiting operation to bypass the cell converter 100 will be described. But first, before this description, the content of failure of the cell converter 100 will be described.

Regarding the failure content, events assumed as failure of the cell converter 100 will be recited below.

1) Open failure of the switching element 1a: in this case, the connection line of the capacitor 2 becomes an open state and thus the voltage of the capacitor 2 reduces, reduction in the output voltage of the self-power-feeding device 3 is induced 2) Open failure of the switching element 1b: in this case, only an operation mode for increasing the voltage of the capacitor 2 exists, and thus the capacitor 2 is eventually led to open failure due to overvoltage, so that the voltage of the capacitor 2 reduces, reduction in the output voltage of the self-power-feeding device 3 is induced.

3) Open failure of the capacitor 2: in this case, the voltage of the capacitor 2 reduces, reduction in the output voltage of the self-power-feeding device 3 is induced.

4) Failure of the gate drive device 9: in this case, the switching elements 1a and 1b can not operate, and as a result, voltage is no longer supplied to the capacitor 2, reduction in the output voltage of the self-power-feeding device 3 is induced.

5) Failure of the self-power-feeding device 3 itself: the output voltage of the self-power-feeding device 3 reduces, and as a result, power feed to the gate drive device 9 and the energy storage unit 5 is stopped.

As described above, failures of the parts of the cell converter 100, except for the bypass unit 4, all lead to the phenomenon in which the output voltage of the self-power-feeding device 3 reduces. Accordingly, in this embodiment, the bypass unit drive device 6 monitors the output voltage of the self-power-feeding device 3, and when the output voltage becomes smaller than a predetermined lower limit value, the bypass unit drive device 6 detects this fact and causes the bypass unit 4 to perform short-circuiting operation by the power energy stored in the energy storage unit 5.

At the time when the failure is detected, the output voltage of the self-power-feeding device 3 has greatly reduced or has become zero, and therefore power feed from the self-power-feeding device 3 cannot be expected. However, the bypass unit 4 can be reliably performed short-circuiting operation by the remaining energy that has been thus far stored in the energy storage unit 5.

As described above, by interposing the diode 10 at the part of the first feed line 7 connected to the energy storage unit 5, even if the output end of the self-power-feeding device 3 is short-circuited, the energy stored in the energy storage unit 5 is not discharged to the failed self-power-feeding device 3 side, but the energy stored in the energy storage unit 5 is reliably used for the short-circuiting operation of the bypass unit 4.

Next, the above protection operation upon failure will be described and confirmed with reference to FIG. 2, through comparison with the conventional case.

FIG. 2(a) shows the case of the present invention. When failure occurs in the cell converter 100 at time t0, due to this, the output voltage of the self-power-feeding device 3 starts to reduce. When the output voltage reaches a set lower limit value at time t1, the bypass unit drive device 6 immediately operates so that the bypass unit 4 is swiftly short-circuited at time t2.

As a result of this short-circuiting operation, as shown by a characteristics curve at the lower stage, the remaining energy stored in the energy storage unit 5 reduces from the full level until then, to the level obtained by subtracting therefrom the energy consumed for one short-circuiting operation.

In contrast, in the conventional case shown in FIG. 2(b), a short-circuit switch of normally-ON type connected to a self-power-feeding device is used for the bypass unit. Therefore, similarly, after failure occurs in the cell converter at time t0, the output voltage of the self-power-feeding device starts to reduce. Then, short-circuiting operation is performed at time t3 when the output voltage reduces to a self-ON level at which the short-circuit switch is allowed to perform self-short-circuiting operation. As a result, a great time difference arises between occurrence of failure and short-circuiting operation of the bypass unit.

On the other hand, in the present invention, by appropriately setting the voltage lower limit value as a threshold value for short-circuiting operation, it becomes possible to swiftly and reliably perform short-circuiting protection operation even if the cell converter 100 has failed, thus it is possible to always safely continue the operation of the power conversion device.

Next, a specific configuration and a latch function of the bypass unit 4 will be described. That is, the bypass unit 4 needs to retain the short-circuiting operation until the self-power-feeding device 3 recovers from failure and the bypass unit 4 receives a reopening command, and therefore the bypass unit 4 needs to have a latch function for retaining the short-circuiting operation after performing the short-circuiting operation.

An example of the latch function will be described for each type of the bypass unit 4. First, the case where the bypass unit 4 is configured by a vacuum switch will be described.

The vacuum switch has a contact to be opened and closed in a valve in a vacuum state, and since the distance needed for insulation can be shortened, size reduction can be achieved, and high-speed short-circuiting operation can be achieved. For the drive force, mainly, a method using an attraction force of a permanent magnet or using a spring is widely known. However, for the operation thereof, a strong drive force by the bypass unit drive device 6 is needed.

Figure 3:
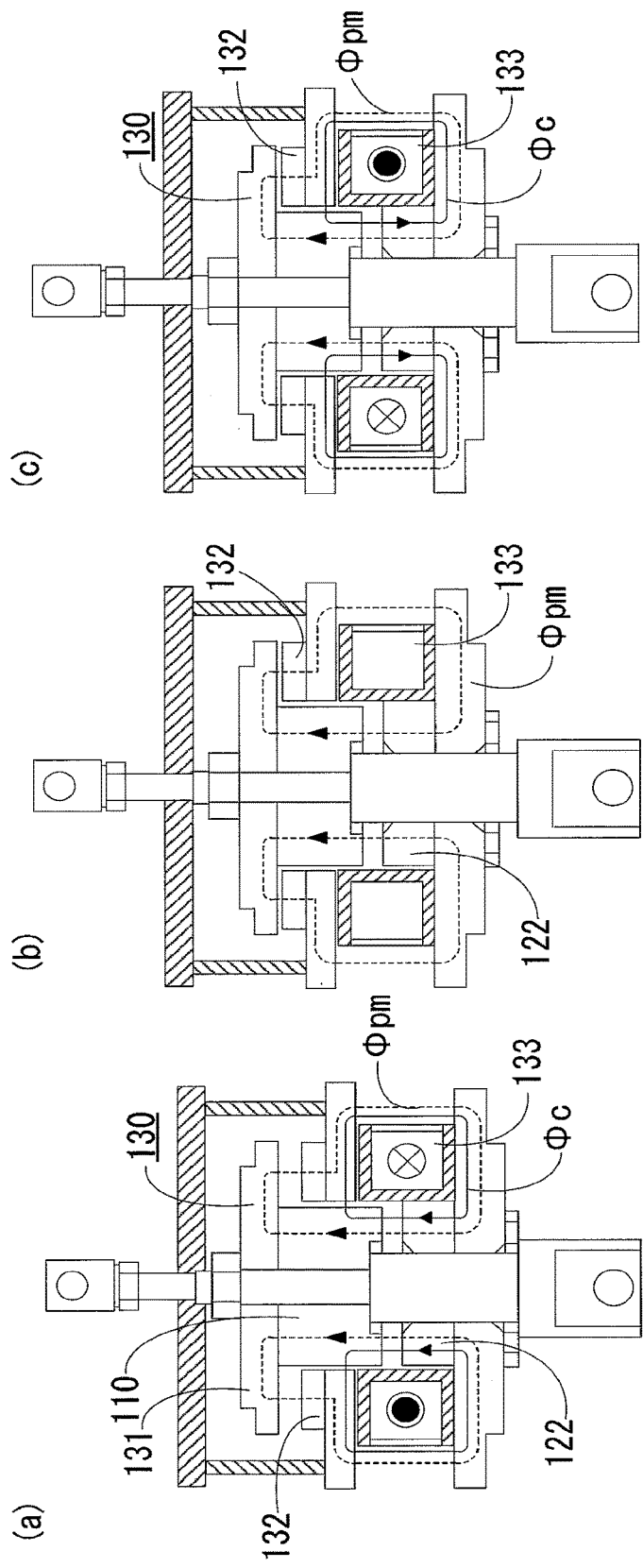
FIG. 3 is a diagram illustrating operation in the case where a vacuum switch is applied as the bypass unit 4 in FIG. 1.

FIG. 3 is a diagram illustrating operation in the case where a vacuum switch is applied to the bypass unit 4. FIG. 3(a) to FIG. 3(c) respectively illustrate principles of the short-circuiting operation, retention of the short-circuiting operation state, and opening operation.

From the initial opened state, when a coil 133 is excited, by a magnetic flux φc due to the coil current, an attraction force is generated between a plunger 110 and a center leg 122, and a movable core 130 starts to move downward in the drawing. Along with the operation of the movable core 130, a movable contact connected thereto moves in the short-circuiting direction. When the short-circuiting operation is completed, as shown in FIG. 3(b), the excitation of the coil 133 is cancelled, and the short-circuiting operation state is retained by only the attraction force of the permanent magnet 132.

At this stage, a cutoff spring and a contact pressure spring (not shown) provided around a center shaft are both in an energized state, to prepare for the next opening operation.

In the opening operation, as shown in FIG. 3(c), current flowing in the direction opposite to that in the short-circuiting operation is supplied to the coil 133. At this time, the magnetic flux φ c due to the coil current acts to cancel a magnetic flux φ pm due to the permanent magnet 132, so that the attraction force between the plunger 110 and the center leg 122 reduces. Thus, when the force by the contact pressure spring and the breaking spring exceeds the attraction force, the movable core 130 moves upward in the drawing, and at the same time, the switching contact is opened.

As described above, this type of vacuum switch has a latch function using the magnetic attraction force of the permanent magnet. After the short-circuiting operation, even if supply of current to the coil is stopped due to failure of the self-power-feeding device 3, the bypass unit 4 can retain the short-circuit state.

As the bypass unit 4, a mechanical switch of a spring type may be used. As compared to the vacuum switch, the mechanical switch is large in size and the short-circuiting operation thereof is slow, but the mechanical switch is inexpensive and easily available. For performing the short-circuiting operation, a strong drive force by the bypass unit drive device 6 is needed.

For the drive force, mainly, a method using a spring is widely known, but for the operation thereof, supply of power is needed. By providing a latch mechanism, latching is performed mechanically after the short-circuiting operation, and thus the short-circuiting operation can be continued unless the latching is released manually.

As described above, the power conversion device according to embodiment 1 of the present invention includes: the energy storage unit 5 which stores and receives voltage of the self-power-feeding device 3, and the bypass unit drive device 6 which causes the bypass unit 4 to perform short-circuiting operation by the power stored in the energy storage unit 5 when the voltage of the self-power-feeding device 3 becomes smaller than a predetermined lower limit value. Thus, by appropriately setting the above voltage lower limit value as a threshold value for the short-circuiting operation, it becomes possible to swiftly and reliably perform short-circuiting protection operation even if the cell converter 100 has failed, thus it is possible to always safely continue the operation of the power conversion device.

Further, since the diode 10 for preventing current from flowing in the direction opposite to the power feed direction is interposed on the first feed line 7 connecting the self-power-feeding device 3 and the energy storage unit 5, even if the output end of the self-power-feeding device 3 is short-circuited, the energy stored in the energy storage unit 5 is not discharged to the failed self-power-feeding device 3 side but is reliably used for the short-circuiting operation of the bypass unit 4.

In addition, the bypass unit has a latch function for retaining the short-circuiting operation after the short-circuiting operation is performed. Thus, after the short-circuiting operation is performed, even if supply of power to the bypass unit drive device 6 is stopped due to failure of the self-power-feeding device 3, the bypass unit 4 can retain the short-circuit state, whereby operation of the power conversion device can be continued without trouble.

Embodiment 2

In the above embodiment 1, the case where the bypass unit 4 is configured so as to perform latching using a magnetic attraction force of a permanent magnet is shown as an example. In the present embodiment 2, a problem in that case and solution thereto will be described.

That is, in the case where the capacity of the energy storage unit 5 is comparatively large, it is assumed that, as shown in the timing chart in FIG. 2(a) above, even after energy is used in order to perform short-circuiting operation of the bypass unit 4, energy that allows the bypass unit 4 to be driven again is left.

In the case where the latch function of the bypass unit 4 is not mechanical, e.g., is a type using the magnetic attraction force of the permanent magnet, as shown in FIG. 3(c) above, if current in the direction opposite to that in the short-circuiting operation is erroneously supplied to the coil, the bypass unit 4 performs opening operation, and thus, operation of the power conversion device cannot be continued.

To prevent this, the storage capacity by which power can be stored in the energy storage unit 5 is set to a minimum capacity that allows short-circuiting operation of the bypass unit 4 by the bypass unit drive device 6 to be performed once.

Figure 4:
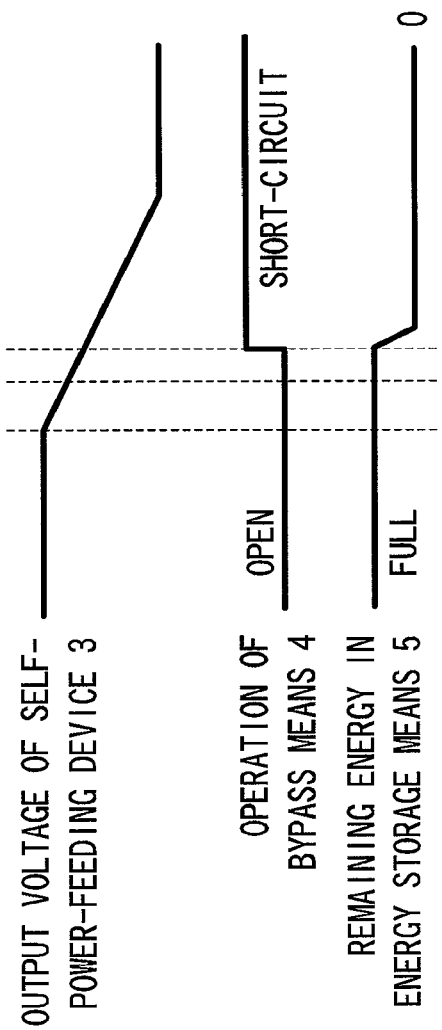
FIG. 4 is a timing chart showing an operation timing of a bypass unit 4 of a power conversion device according to embodiment 2 of the present invention.

FIG. 4 is a timing chart showing an operation timing of the bypass unit 4 in this case. After energy is used in order to perform short-circuiting operation of the bypass unit 4, the remaining energy in the energy storage unit 5 becomes almost zero. Even if operation is erroneously performed to supply current to the coil in the direction opposite to that in the short-circuiting operation, opening operation of the bypass unit 4 is reliably prevented because there is no energy for actually driving the bypass unit 4.

As described above, in the power conversion device according to embodiment 2 of the present invention, the storage capacity by which power can be stored in the energy storage unit 5 is set to a minimum capacity that allows short-circuiting operation of the bypass unit 4 by the bypass unit drive device 6 to be performed once. Thus, opening operation of the bypass unit 4 by erroneous operation after the short-circuiting operation is reliably prevented.

Embodiment 3

In the above embodiments 1 and 2, it is described that, in the power conversion device, when failure occurs in any of the cell converters 100, the bypass unit 4 of this cell converter 100 is swiftly and reliably performed short-circuiting operation, thereby the operation can be always safely continued.

On the other hand, in the present embodiment 3, it is assumed that failure does not occur in any cell converter 100 and therefore the power conversion device is normal, but due to accident outside the power conversion device, such as system short-circuit accident, the power conversion device is stopped, output voltages of the self-power-feeding devices 3 of all the cell converters 100 reduce, and all the bypass units 4 perform short-circuiting operation.

In this case, after the outside accident is eliminated and the system recovers, the power conversion device is naturally expected to swiftly restart the operation. The present embodiment 3 is devised to meet such an expectation.

Figure 5:
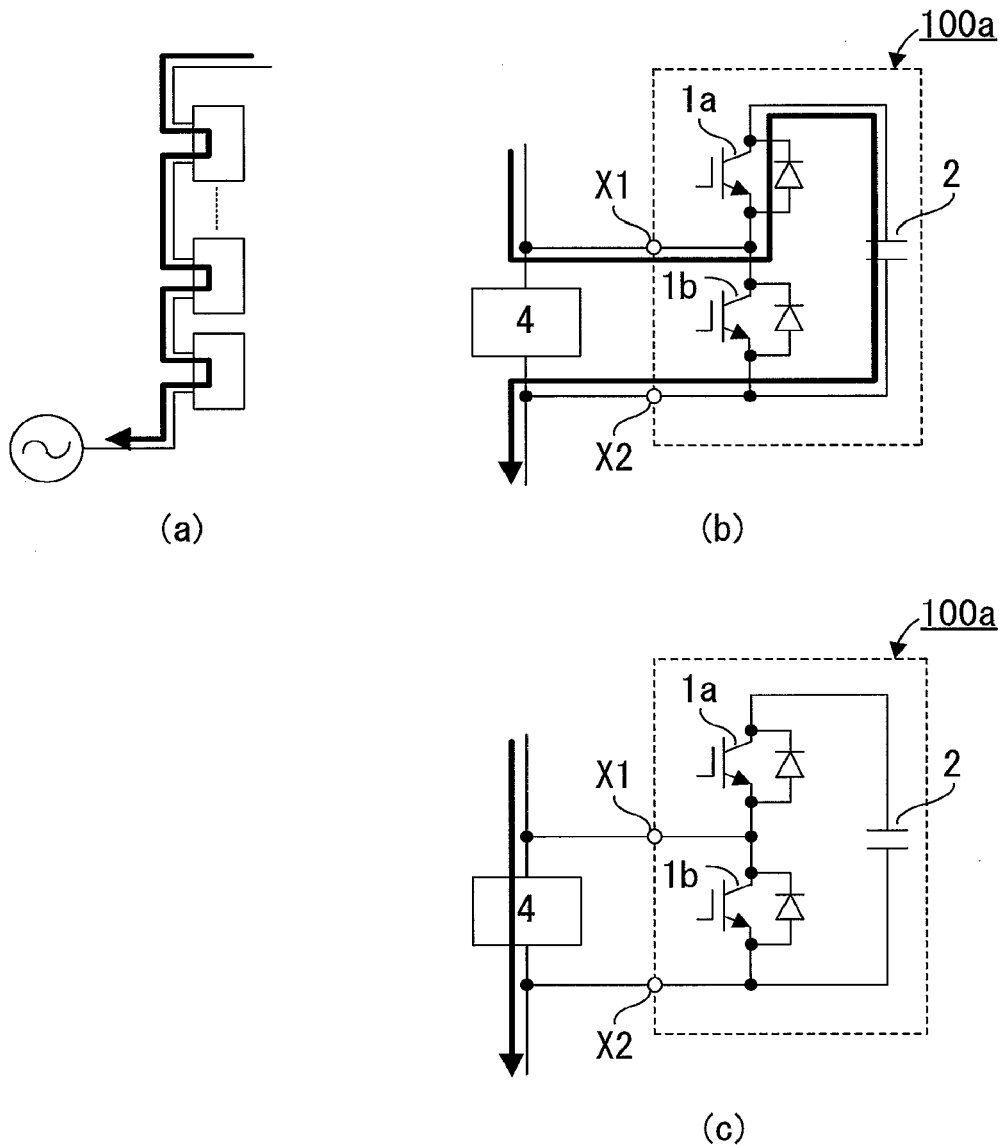
FIG. 5 is a diagram illustrating a phenomenon due to charge operation of a capacitor 2.

FIG. 5 illustrates a phenomenon due to charge operation of the capacitor 2. During operation of the power conversion device, as shown in FIG. 5(a) and FIG. 5(b), at the timing when the switching element 1b is controlled to be OFF, current from the external terminal X1 is supplied to the capacitor 2 via the upper diode, and the capacitor 2 is charged. Thus, the self-power-feeding device 3 is supplied with voltage from the capacitor 2 and the self-power-feeding device 3 can operate.

Here, as described above, if outside accident occurs and the power conversion device is stopped, supply of current into the cell converter 100 is stopped, the voltage of the capacitor 2 reduces, and then, as described in the above embodiments, when reaching the set lower limit value, the bypass unit 4 performs short-circuiting operation.

Once the bypass unit 4 is short-circuited, thereafter, even if current is supplied, as shown in FIG. 5(c), the current mostly flows through only the bypass unit 4, and the capacitor 2 is not charged.

As a result, in the conventional case where a short-circuit switch of normally-ON type is used for the bypass unit, even if the outside accident is eliminated and the system recovers, the power conversion device cannot be restarted unless the bypass unit is operated to open by any external power source.

On the other hand, in the present invention, as described in the above embodiment 1, a method of driving the bypass unit 4 by power stored in the energy storage unit 5 is used, whereby it is possible to restart the power conversion device. However, unlike the above embodiment 2, the energy storage unit 5 needs to have at least a capacity necessary for performing short-circuiting operation of the bypass unit 4 once and further, after the short-circuiting operation, for causing the bypass unit 4 to perform opening operation.

Figure 6:
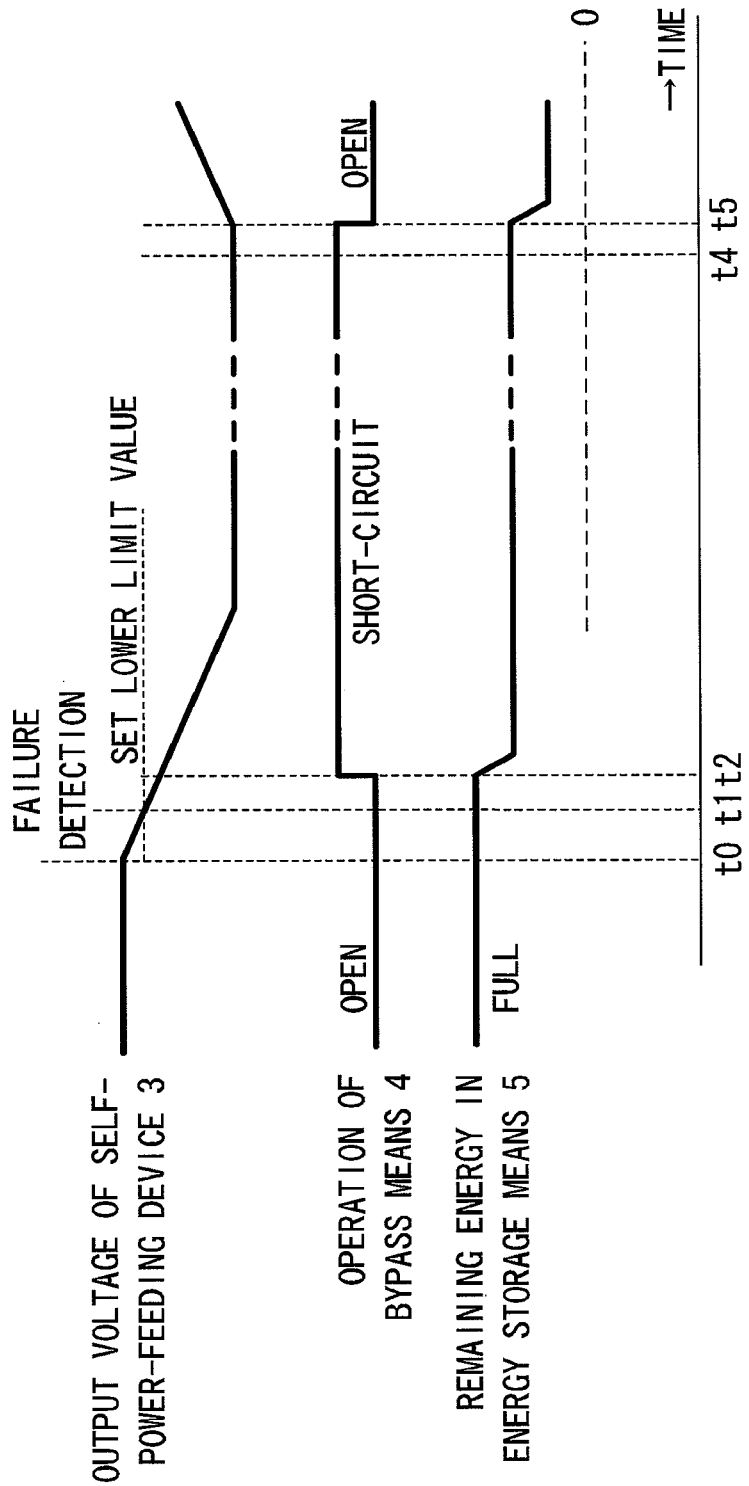
FIG. 6 is a timing chart showing an operation timing of a bypass unit 4 of a power conversion device according to embodiment 3 of the present invention.

FIG. 6 is a timing chart showing an operation timing of the bypass unit 4 of the power conversion device according to embodiment 3 of the present invention.

In FIG. 6, at time t0, the power conversion device is stopped, and then, when the output voltage of the self-power-feeding device 3 reduces to a set lower limit value at time t1, the bypass unit drive device 6 regards this as a failure detection and immediately causes the bypass unit 4 to perform short-circuiting operation by power stored in the energy storage unit 5 (time t2).

Thereafter, the outside accident is eliminated and the system recovers, and then, when the bypass unit drive device 6 receives an opening command at time t4, as shown in FIG. 3(c) above, by the remaining power stored in the energy storage unit 5, the bypass unit drive device 6 immediately releases the latch function of the bypass unit 4 and causes the bypass unit 4 to perform opening operation (time t5).

In the above, measure for restart in the case where the power conversion device itself is not abnormal but is stopped due to occurrence of outside accident has been described. However, this is similarly applicable to measure for restart of the cell converter in the case where, due to failure of the cell converter, the bypass unit of the cell converter performs short-circuiting operation and thereafter the cell converter recovers from the failed state.

As described above, the bypass unit drive device 6 of the power conversion device according to embodiment 3 of the present invention is configured to, when receiving an opening command after causing the bypass unit 4 to perform short-circuiting operation, by power stored in the energy storage unit 5, release the latch function of the bypass unit 4 and cause the bypass unit 4 to perform opening operation. Thus, by appropriately setting the capacity of the energy storage unit 5, it is possible to swiftly restart the cell converter 100 and the power conversion device.

It is noted that, within the scope of the present invention, the above embodiments may be freely combined with each other, or each of the above embodiments may be modified or eliminated appropriately.

The invention claimed is:

1. A power conversion device comprising a plurality of cell converters connected in series to each other, each cell converter having: a main circuit including switching elements and a capacitor; a pair of external terminals for leading the main circuit to outside; a bypass unit capable of making short circuit between the pair of external terminals; a gate drive device for performing ON/OFF control of the switching elements, thereby for performing power conversion between the pair of external terminals and the capacitor; and a self-power-feeding device for receiving voltage of the capacitor and for feeding power to the gate drive device, the power conversion device comprising:

an energy storage unit for receiving and storing voltage of the self-power-feeding device; and a bypass unit drive device for causing the bypass unit to perform short-circuiting operation by power stored in the energy storage unit when voltage of the self-power-feeding device becomes smaller than a predetermined lower limit value.

2. The power conversion device according to claim 1, wherein a diode for preventing current from flowing in a direction opposite to a power feed direction is interposed on a feed line connecting the self-power-feeding device and the energy storage unit.

3. The power conversion device according to claim 1, wherein the bypass unit has a latch function for, after the short-circuiting operation is performed, retaining the short-circuiting operation.

4. The power conversion device according to claim 3, wherein the bypass unit is a vacuum switch using a magnetic attraction force of a permanent magnet for the latch function.

5. The power conversion device according to claim 3, wherein the bypass unit is a mechanical switch in which the latch function is allowed to be released by only manual operation.

6. The power conversion device according to claim 3, wherein when receiving an opening command after causing the bypass unit to perform short-circuiting operation, by the power stored in the energy storage unit, the bypass unit drive device releases the latch function and causes the bypass unit to perform opening operation.

7. The power conversion device according to claim 1, wherein a storage capacity by which power can be stored in the energy storage unit is set to a minimum capacity that allows short-circuiting operation of the bypass unit by the bypass unit drive device to be performed once.

8. The power conversion device according to claim 1, wherein the energy storage unit is a capacitor.

9. The power conversion device according to claim 1, wherein the energy storage unit is a storage battery.

* * * * *